(12) United States Patent
Houston et al.

(10) Patent No.: US 9,267,380 B2
(45) Date of Patent: Feb. 23, 2016

(54) AIRFOIL INCLUDING LOOSE DAMPER

(75) Inventors: David P. Houston, Glastonbury, CT (US); Tracy A. Propheter-Hinckley, Manchester, CT (US); Benjamin T. Fisk, East Granby, CT (US); Anita L. Tracy, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 848 days.

(21) Appl. No.: 13/454,488

(22) Filed: Apr. 24, 2012

(65) Prior Publication Data
US 2013/0276457 A1    Oct. 24, 2013

(51) Int. Cl.
| *F01D 5/16* | (2006.01) |
| *B22F 3/105* | (2006.01) |
| *B22F 5/04* | (2006.01) |
| *B22F 5/10* | (2006.01) |

(52) U.S. Cl.
CPC .............. *F01D 5/16* (2013.01); *B22F 3/1055* (2013.01); *B22F 5/04* (2013.01); *B22F 5/10* (2013.01); *F05D 2250/232* (2013.01)

(58) Field of Classification Search
CPC ............ F01D 5/16; F01D 5/26; F01D 25/06; F05D 2260/96
See application file for complete search history.

(56) References Cited

U.S. PATENT DOCUMENTS

| 1,833,751 | A | 7/1929 | Kimball |
| 2,343,918 | A | 5/1943 | McCoy |
| 4,815,939 | A | 3/1989 | Doble |
| 5,038,014 | A | 8/1991 | Pratt et al. |
| 5,165,860 | A | 11/1992 | Stoner et al. |
| 5,837,960 | A | 11/1998 | Lewis et al. |
| 6,193,465 | B1 | 2/2001 | Liotta et al. |
| 6,283,707 | B1 | 9/2001 | Chin |
| 6,391,251 | B1 | 5/2002 | Keicher et al. |
| 6,669,447 | B2 | 12/2003 | Norris et al. |
| 7,029,232 | B2 | 4/2006 | Tuffs et al. |
| 7,112,044 | B2 | 9/2006 | Whitehead et al. |
| 7,121,800 | B2 | 10/2006 | Beattie |
| 7,121,801 | B2 | 10/2006 | Surace et al. |
| 7,217,093 | B2 | 5/2007 | Propheter et al. |
| 7,270,517 | B2 | 9/2007 | Garner |
| 7,857,588 | B2 | 12/2010 | Propheter-Hinckley et al. |
| 2005/0169754 | A1* | 8/2005 | Surace et al. ............... 416/97 R |
| 2008/0290215 | A1 | 11/2008 | Udall et al. |
| 2009/0258168 | A1 | 10/2009 | Barcock |

(Continued)

FOREIGN PATENT DOCUMENTS

| GB | 561897 | 6/1944 |
| WO | 2011019412 | 2/2011 |

OTHER PUBLICATIONS

International Preliminary Report on Patentability for PCT Application No. PCT/US/2013/037501, mailed Nov. 6, 2014.

(Continued)

*Primary Examiner* — Craig Kim
(74) *Attorney, Agent, or Firm* — Carlson, Gaskey & Olds, P.C.

(57) ABSTRACT

An airfoil includes an airfoil body that has a leading edge and a trailing edge and a first sidewall and a second sidewall that is spaced apart from the first sidewall. The first sidewall and the second sidewall join the leading edge and the trailing edge and at least partially define a cavity in the airfoil body. A damper member is enclosed in the cavity and is loose within the cavity.

12 Claims, 6 Drawing Sheets

(56) References Cited

U.S. PATENT DOCUMENTS

2009/0304497 A1   12/2009   Meier et al.
2011/0038734 A1   2/2011   Marra
2011/0048664 A1   3/2011   Kush et al.

OTHER PUBLICATIONS

European Search Report for European Patent Application No. 13782220.1 completed on Mar. 24, 2015.

* cited by examiner

AIRFOIL INCLUDING LOOSE DAMPER

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures within the airfoil. The die casting technique inherently limits the geometry, size, wall thickness and location of airfoil structures. Thus, the design of a traditional airfoil is limited to structures that can be manufactured using the die casting technique, which in turn may limit the performance of the airfoil.

SUMMARY

An airfoil according to an exemplary aspect of the present disclosure includes an airfoil body that has a leading edge and a trailing edge and a first sidewall and a second sidewall that is spaced apart from the first sidewall. The first sidewall and the second sidewall join the leading edge and the trailing edge and at least partially define a cavity in the airfoil body. A damper member is enclosed and loose within the cavity.

In a further non-limiting embodiment of the above example, the damper member is tapered.

A further non-limiting embodiment of any of the foregoing examples includes at least one guide member fixed with regard to the first sidewall and the second sidewall. At least one guide member includes a bearing surface that circumscribes the damper member.

In a further non-limiting embodiment of any of the foregoing examples, the bearing surface is frustoconical.

In a further non-limiting embodiment of any of the foregoing examples, the airfoil body defines a longitudinal axis, and the bearing surface is inclined with regard to the longitudinal axis.

In a further non-limiting embodiment of any of the foregoing examples, the at least one guide member includes at least one support arm fixed to at least one of the first sidewall or the second sidewall, and a guide piece is supported on the least one support arm, the guide piece including a guide wall that defines an opening through which the damper member extends, the guide wall including the bearing surface.

In a further non-limiting embodiment of any of the foregoing examples, the at least one support arm is inclined with respect to a longitudinal axis defined by the airfoil body.

In a further non-limiting embodiment of any of the foregoing examples, the at least one support arm includes at least one opening there through.

In a further non-limiting embodiment of any of the foregoing examples, the at least one guide member includes a plurality of guide members that are longitudinally spaced apart with respect to a longitudinal axis defined by the airfoil body.

In a further non-limiting embodiment of any of the foregoing examples, the at least one guide member includes a cup having sidewalls, a bottom wall joining the sidewalls, and an open top through which the damper member extends.

In a further non-limiting embodiment of any of the foregoing examples, the bottom wall includes openings extending there through.

In a further non-limiting embodiment of any of the foregoing examples, the damper member is longitudinally elongated with respect to a longitudinal axis defined by the airfoil body.

In a further non-limiting embodiment of any of the foregoing examples, the damper member extends between a first terminal end and a second terminal end, and the first terminal end and the second terminal end are free of any connection to the airfoil body.

In a further non-limiting embodiment of any of the foregoing examples, the damper member includes longitudinally alternating bearing sections and non-bearing sections with respect to a longitudinal axis defined by the airfoil body.

A turbine engine according to an exemplary aspect of the present disclosure includes, optionally a fan, a compressor section, a combustor in fluid communication with the compressor section, and a turbine section in fluid communication with the combustor. The turbine section is coupled to drive the compressor section and the fan. At least one of the fan, the compressor section and the turbine section includes an airfoil having an airfoil body including a leading edge and a trailing edge and a first sidewall and a seconds sidewall that is spaced apart from the first sidewall. The first sidewall and the second sidewall join the leading edge and the trailing edge and at least partially define a cavity in the airfoil body. A damper member is enclosed and loose within the cavity.

In a further non-limiting embodiment of any of the foregoing examples, the damper member is tapered.

A further non-limiting embodiment of any of the foregoing examples includes at least one guide member fixed with regard to the first sidewall and the second sidewall, the at least one guide member includes a bearing surface that circumscribes the damper member.

In a further non-limiting embodiment of any of the foregoing examples, the bearing surface is frustoconical.

In a further non-limiting embodiment of any of the foregoing examples, the damper member includes longitudinally alternating bearing sections and non-bearing sections with respect to a longitudinal axis defined by the airfoil body.

A method for processing an airfoil according to an exemplary aspect of the present disclosure includes depositing multiple layers of a powdered metal onto one another, joining the layers to one another with reference to data relating to a particular cross-section of an airfoil, and producing the airfoil with an airfoil body including a leading edge and a trailing edge and a first sidewall and a second sidewall that is spaced apart from the first sidewall. The first sidewall and the second sidewall join the leading edge and the trailing edge and at least partially define a cavity in the airfoil body, and a damper member is enclosed and loose within the cavity.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
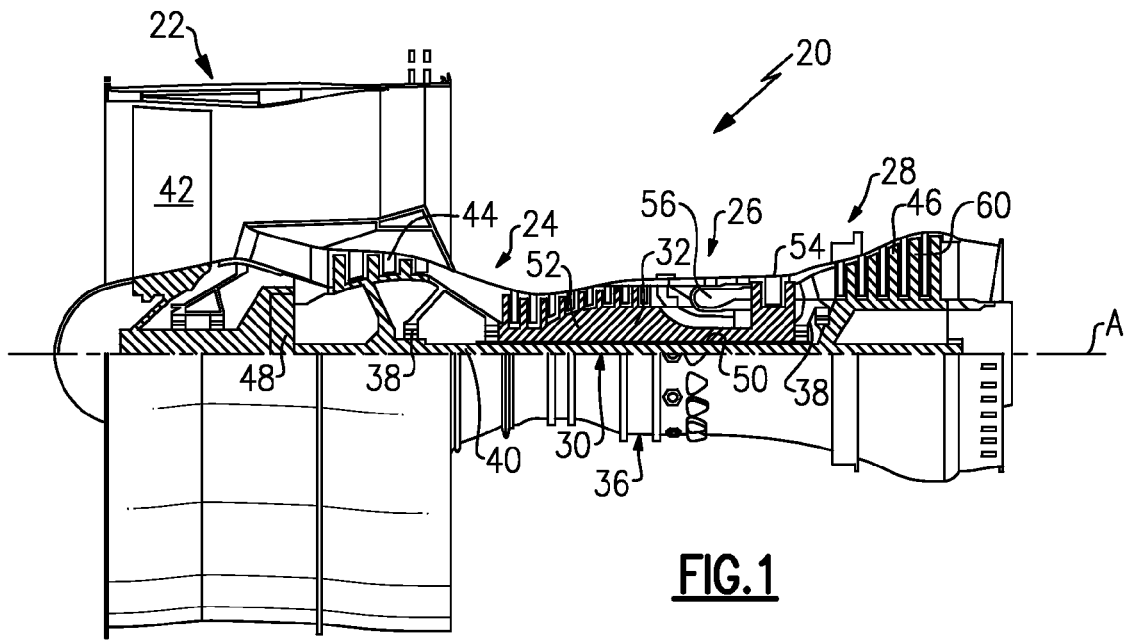
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
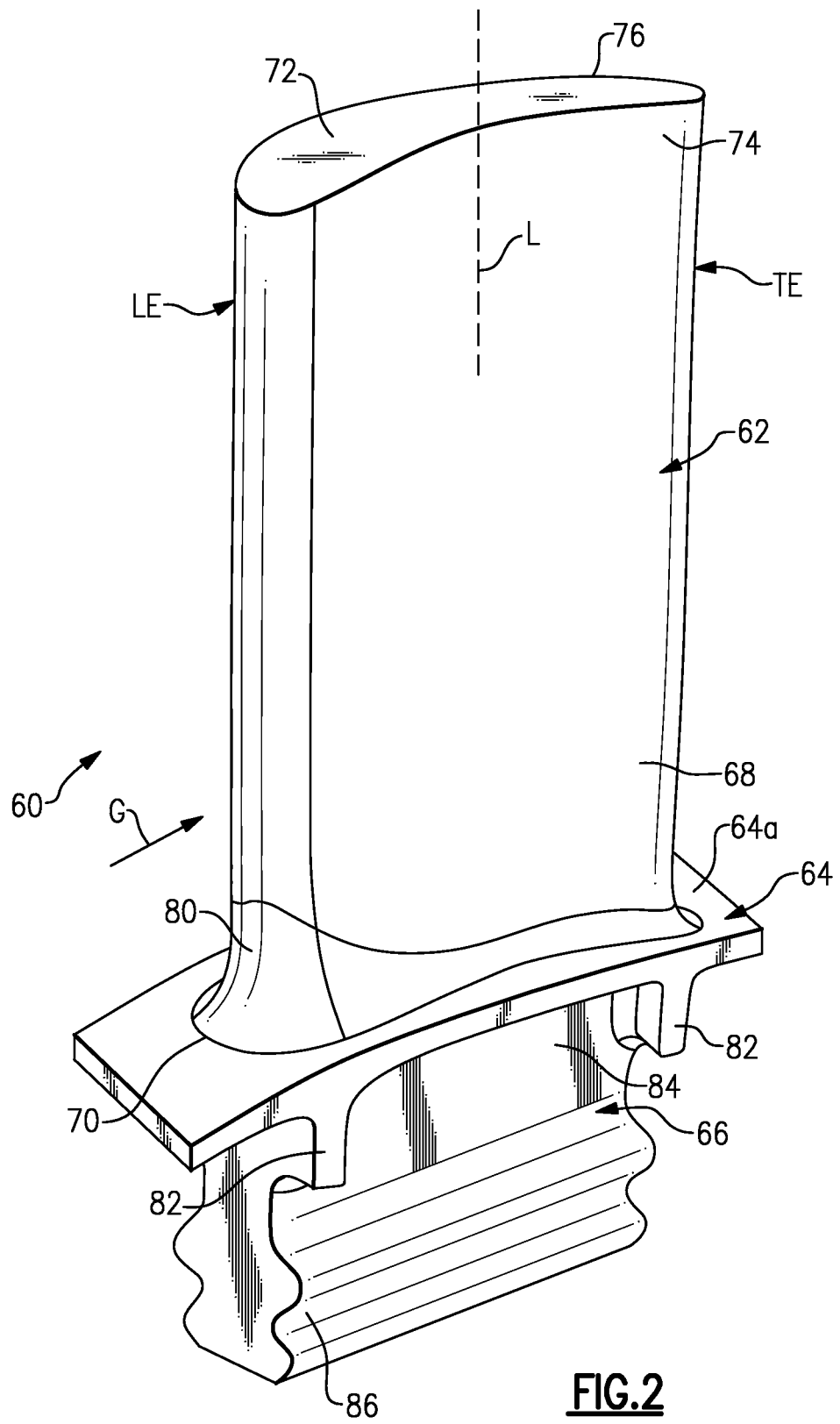
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first sidewall 74 and a second sidewall 76 that is spaced apart from the first sidewall 74. The first sidewall 74 and the second sidewall 76 join the leading edge (LE) and the trailing edge (TE) and at least partially define a cavity 78 (FIG. 3) in the body 68.

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3:
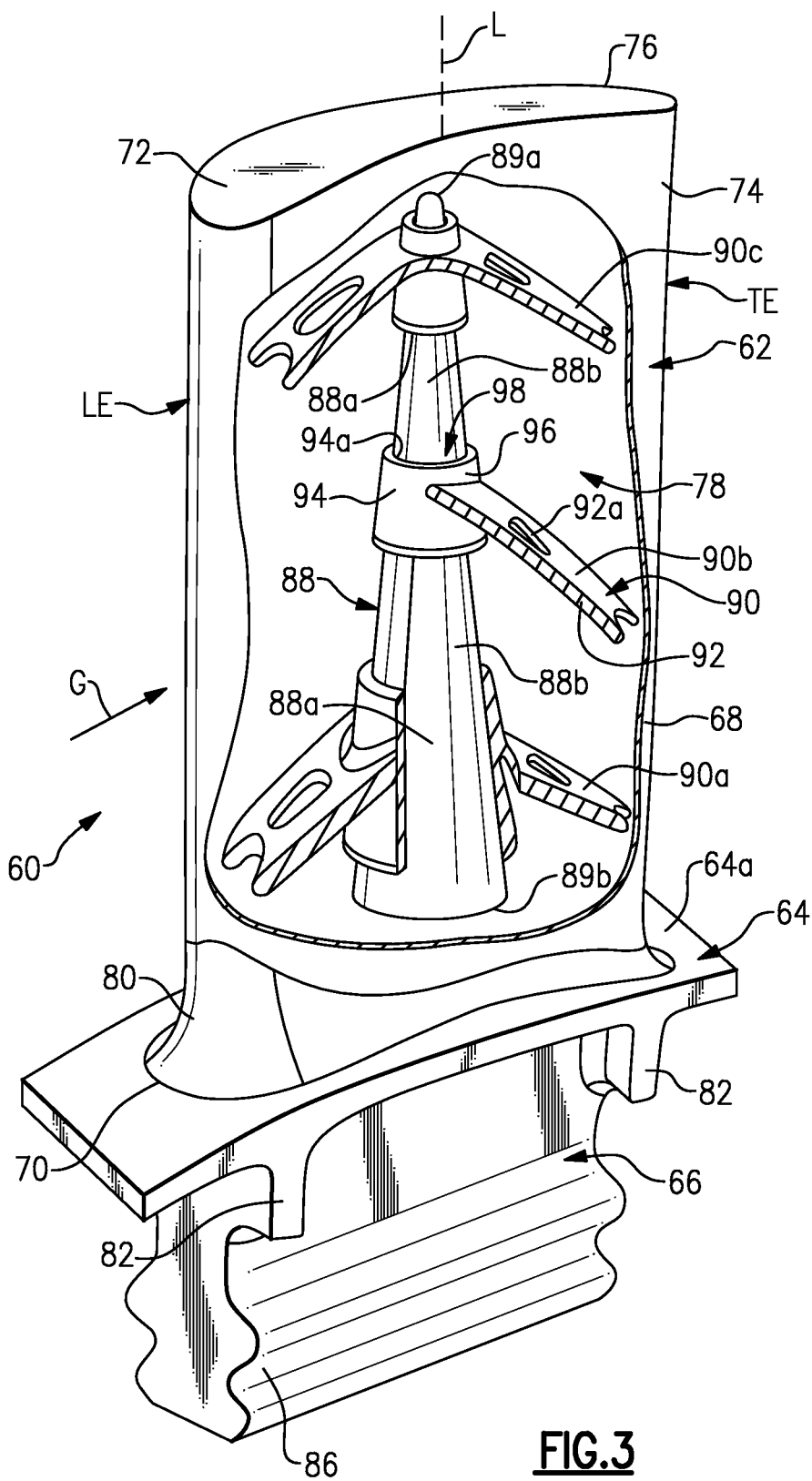
FIG. 3 shows the airfoil of FIG. 2 with a portion cutaway to reveal an interior cavity and damper member.

FIG. 3 shows the airfoil 60 with a portion of the first sidewall 74 cutaway to reveal the cavity 78 within the airfoil body 68. The airfoil 60 in this example is an uncooled structure and the cavity 78 is thus completely sealed from the exterior of the airfoil 60. The airfoil 60 includes a damper member 88 enclosed in the cavity 78. The damper member 88 is loose within the cavity 78 such that the damper member 88 is permitted to move at least longitudinally within the cavity 78. The term "loose" as used in this disclosure refer to the damper member 88 being free-floating, free of any rigid connections to any other structures, although neighboring structures may limit movement of the damper member 88.

In this example, the damper member 88 is longitudinally elongated and tapers from the base 70 toward the tip end 72 of the airfoil portion 62. As an example, the damper member 88 has a geometric shape and in this example is generally conical. It is to be understood, however, that the damper member 88 can have other geometric shapes or even non-basic geometric shapes.

The damper member 88 extends between a first terminal end 89a and a second terminal end 89b. The terminal ends 89a and 89b are free of any connection, rigid or otherwise, to the airfoil body 68. Thus, the damper member 88 is loose and free-floating within the cavity 78.

The airfoil body 68 includes at least one guide member 90 that is fixed with regard to the first sidewall 74 and the second sidewall 76. In the illustrated example, the airfoil body 68 includes three such guide members 90a, 90b and 90c. It is to be understood, however, that the airfoil body 68 may alternatively include only a single guide member 90 or may include more than three guide members 90.

Each of the guide members 90 includes a support arm 92 that is fixed to at least one of the first sidewalls 74 or the second sidewall 76. In the illustrated example, the support arm 92 is inclined with regard to the longitudinal axis L, to distribute load. Alternatively, the inclination of the support arm 92 could be inverted.

Each of the guide members 90 includes a guide piece 94 supported on the respective support arm or arms 92. The guide piece 94 circumscribes the damper member 88 and includes an inner bearing surface 94a which, under certain circumstances that will be described below, contacts the damper member 88. In this example, the bearing surface 94a is frustoconical to provide an area contact with the conical shape of the damper member 88. In that regard, the damper member 88 includes longitudinally alternating bearing sections 88a (bounded by dashed lines) and non-bearing sections 88b. The bearing sections 88a are sections of the damper member 88 that contact, or are able to contact, the bearing surfaces 94a of the guide members 90, while the non-bearing sections 88b do not contact, and are not able to contact, the bearing surfaces 94a of the guide members 90. That is, the damper member 88 has limited movement within the cavity 78.

Figure 4:
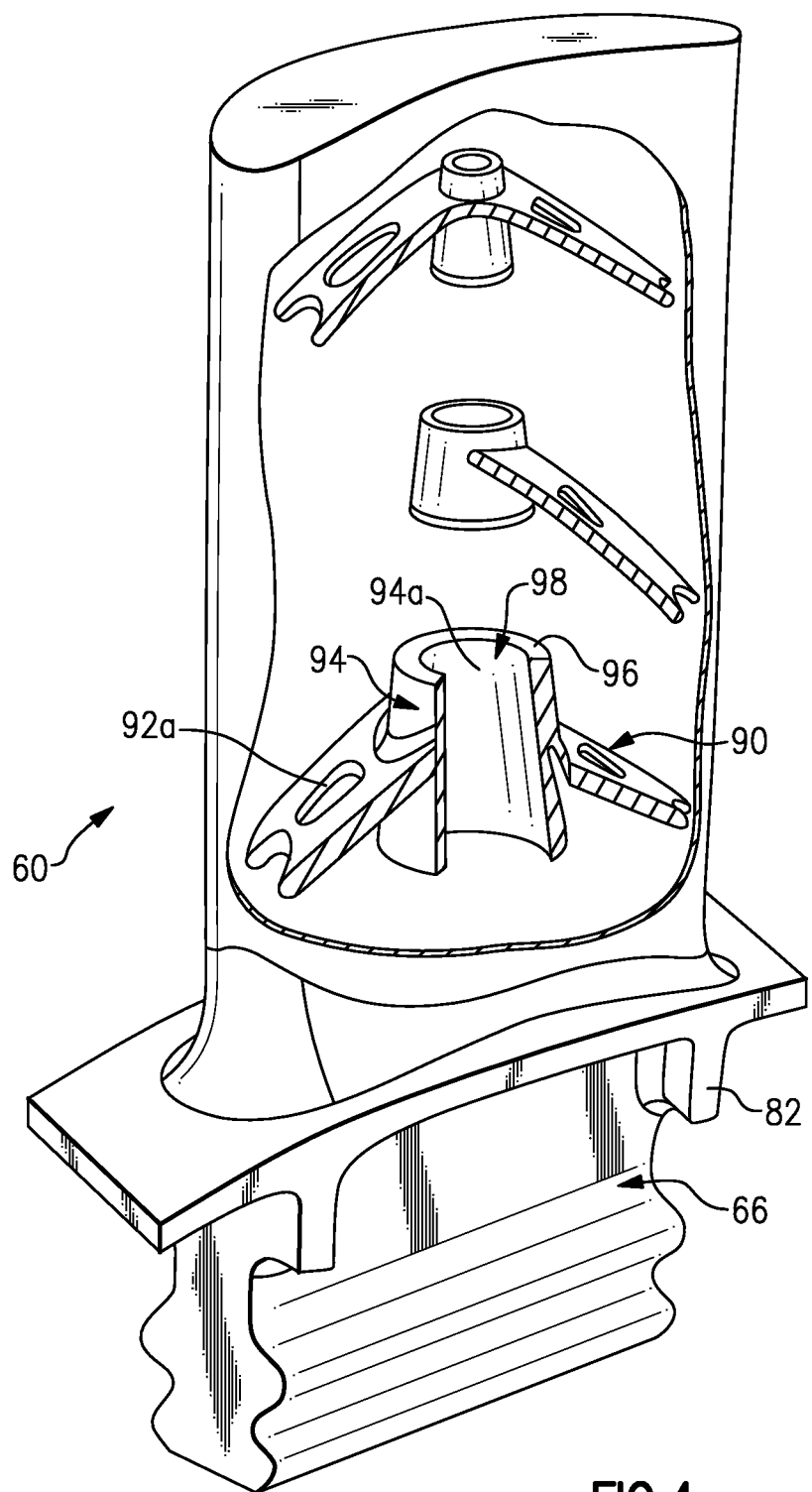
FIG. 4 shows the airfoil of FIG. 3 without the damper member.
Figure 5:
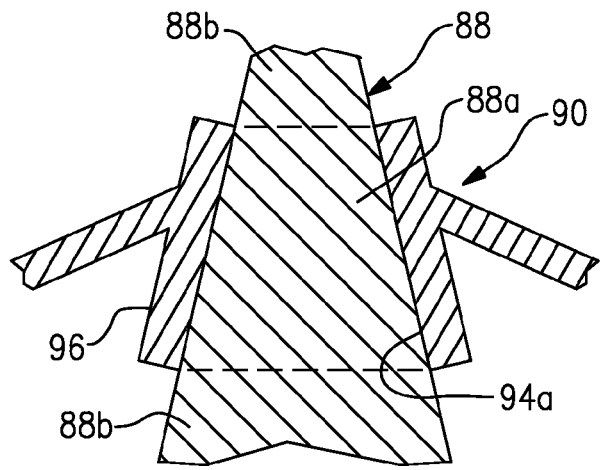
FIG. 5 shows a cross-section of a damper member and a guide member.

FIG. 4 illustrates a view of the airfoil 60 without the damper member 88 such that the guide members 90 can be more clearly seen and FIG. 5 shows a cross-section through a portion of the damper member 88 and guide piece 94 of guide member 90.

The guide piece 94 includes a guide wall 96 that defines at least one opening 98 through which the damper member 88 extends. The guide wall 96 includes the bearing surface 94a. The three guide members 90a, 90b and 90c are longitudinally spaced apart from each other within the cavity 78. Optionally, each of the support arms 92 includes an opening 92a there through (see also FIG. 3) for weight-reduction of the airfoil 60.

When the airfoil 60 is in a static state, such as when the engine 20 in not in operation or the turbine section 28 is not rotating, the loose damper member 88 may sit on the bottom of the cavity 78. Upon rotation of the airfoil 60 about engine central axis A, the damper member 88 is thrown longitudinally outwardly toward the tip end 72 of the airfoil 60. The damper member 88 wedges against the bearing surfaces 94a of the guide pieces 94. The friction between the damper member 88 and the bearing surfaces 94a removes energy from the system and thus serves to dampen vibrations of the airfoil 60.

As can be appreciated, the size and location of the damper member 88, size of the bearing surfaces 94a, number and size of guide members 90 and the location of attachments of the guide members 90 to the sidewalls 74/76 can be tailored to adjust the dampening effect. As an example, the contact area between the damper member 88 and the bearing surfaces 94 influences the amount of energy absorbed, and thus the dampening effect, at a particular location and can be tailored at a design stage by changing this contact area. A greater overall contact area provides a greater amount of energy absorbance and a lower overall contact area provides a relatively lesser amount of absorbance.

Figure 6:
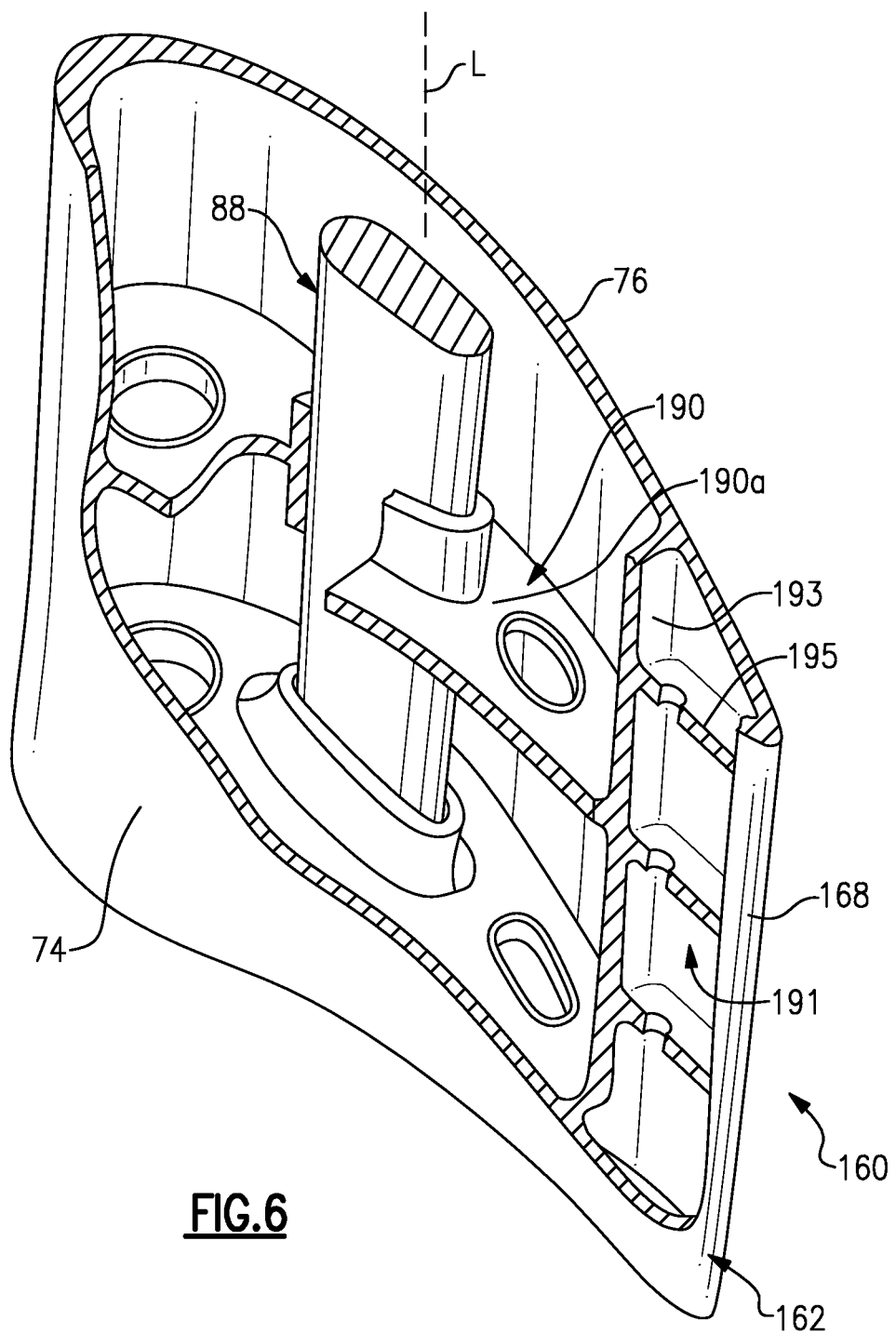
FIG. 6 shows a portion of a modified airfoil having a wing strut.

FIG. 6 shows a portion of a modified airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 additionally includes a wing strut structure 191, which is connected to the guide member 190. The wing strut structure 191 in this example includes a longitudinally extending rib 193 connected with the first sidewall 74 and the second sidewall 76, and lateral ribs 195 that extend laterally with respect to the longitudinal axis L and connect the first sidewall 74, the second sidewall 76 and the longitudinally extending rib 193. The wing strut structure 191 reinforces the sidewalls 74 and 76, as well as the guide member 190.

Figure 7A:
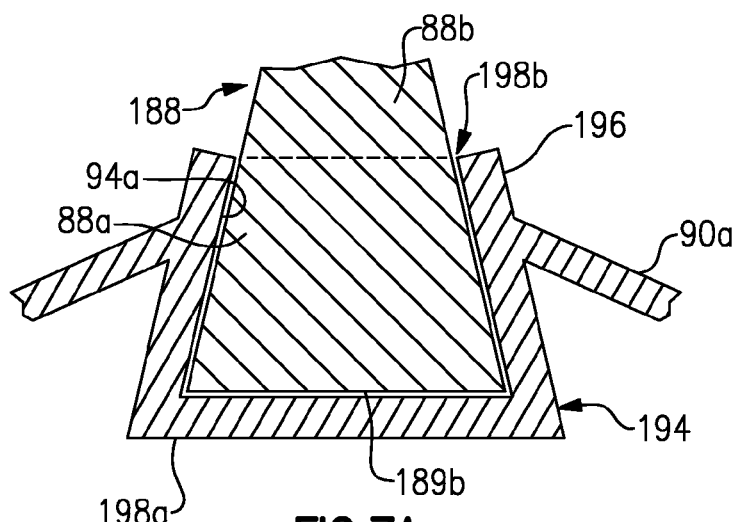
FIG. 7A shows a cross-section of a damper member and a modified guide member having a cup structure.
Figure 7B:
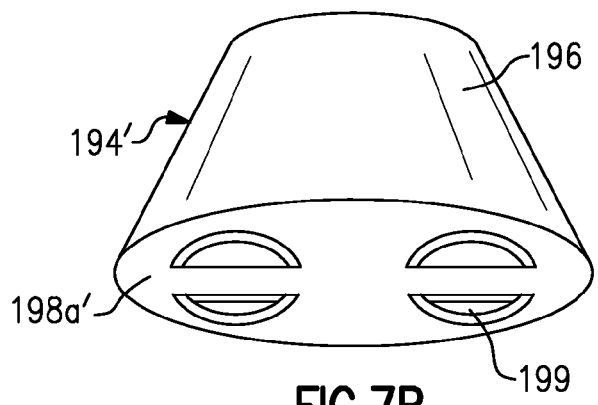
FIG. 7B shows a cross-section of a another modified guide member having a cup structure.

As shown in FIG. 3, the damper member 88 spans lengthwise throughout most of the longitudinal length of the cavity 78. However, in other examples, the damper member 88 can be shorter or longer than shown. If the damper member 88 is shorter than shown, the bottom-most guide member 90a may be modified as shown in FIG. 7A or 7B. In this example, the guide piece 194/194' is a cup having sidewalls 196, a bottom wall 198a/198a' that joins the sidewalls 196, and an open top 198b through which the damper member 188 extends. That is, the second terminal end 189b of the damper member 188 is received into the guide piece 194/194' and sits on the bottom wall 198a/198a' when the airfoil 60 is in a static state. In the example of FIG. 7A, the bottom wall 198a is solid. In the example of FIG. 7B, the bottom wall 198a' has openings 199 to reduce weight and/or to permit powder removal in the additive manufacturing process described below. Thus, the cup-like structure can support the damper member 188 at any longitudinal position within the cavity 78.

Figure 8:
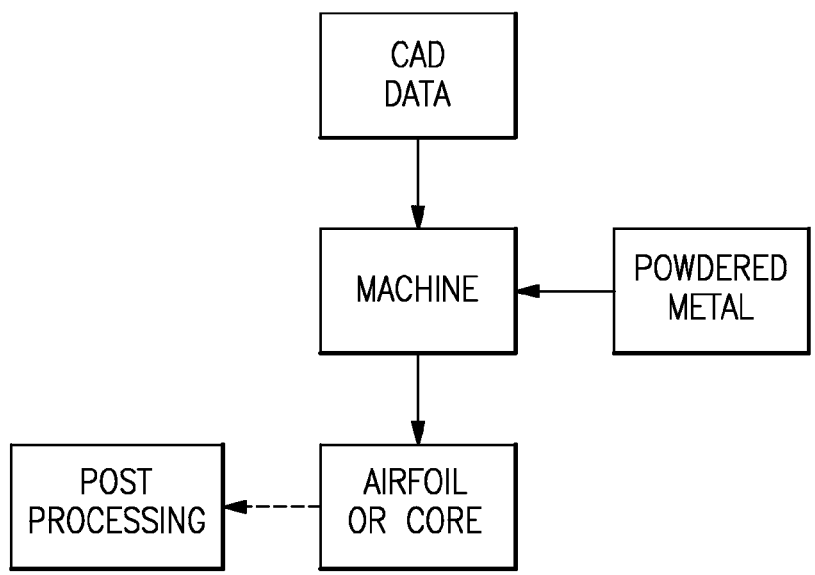
FIG. 8 shows an example method for processing an airfoil.

The geometries disclosed herein may be difficult to form using conventional casting technologies. Thus, a method of processing an airfoil having the features disclosed herein includes an additive manufacturing process, as schematically illustrated in FIG. 8. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities or openings, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body including a leading edge and a trailing edge and a first sidewall and a second sidewall that is spaced apart from the first sidewall, the first sidewall and the second sidewall joining the leading edge and the trailing edge and at least partially defining a cavity in the airfoil body;
   a damper member enclosed in the cavity, the damper member being loose within the cavity; and
   at least one guide member fixed with regard to the first sidewall and the second sidewall, the at least one guide member including a bearing surface that circumscribes the damper member, wherein the at least one guide member includes at least one support arm fixed to at least one of the first sidewall or the second sidewall, and a guide piece is supported on the least one support arm, the guide piece including a guide wall that defines an opening through which the damper member extends, the guide wall including the bearing surface.

2. The airfoil as recited in claim 1, wherein the at least one support arm is inclined with respect to a longitudinal axis defined by the airfoil body.

3. The airfoil as recited in claim 1, wherein the at least one support arm includes at least one opening there through.

4. The airfoil as recited in claim 1, wherein the damper member is enclosed inside the cavity.

5. An airfoil comprising:
an airfoil body including a leading edge and a trailing edge and a first sidewall and a second sidewall that is spaced apart from the first sidewall, the first sidewall and the second sidewall joining the leading edge and the trailing edge and at least partially defining a cavity in the airfoil body;
a damper member enclosed in the cavity, the damper member being loose within the cavity; and
at least one guide member fixed with regard to the first sidewall and the second sidewall, the at least one guide member including a bearing surface that circumscribes the damper member, wherein the at least one guide member includes a cup having cup sidewalls, a cup bottom wall joining the cup sidewalls, and an open top through which the damper member extends.

6. The airfoil as recited in claim 5, wherein the bottom wall includes openings extending there through.

7. A turbine engine comprising:
a fan;
a compressor section;
a combustor in fluid communication with the compressor section; and
a turbine section in fluid communication with the combustor, the turbine section being coupled to drive the compressor section and the fan, and
at least one of the fan, the compressor section and the turbine section including an airfoil having an airfoil body including a leading edge and a trailing edge and a first sidewall and a second sidewall that is spaced apart from the first sidewall, the first sidewall and the second sidewall joining the leading edge and the trailing edge and at least partially defining a cavity in the airfoil body, a damper member enclosed in the cavity, the damper member being loose within the cavity, and at least one guide member fixed with regard to the first sidewall and the second sidewall, the at least one guide member including a bearing surface that circumscribes the damper member, wherein the at least one guide member includes at least one support arm fixed to at least one of the first sidewall or the second sidewall, and a guide piece is supported on the least one support arm, the guide piece including a guide wall that defines an opening through which the damper member extends, the guide wall including the bearing surface.

8. The turbine engine as recited in claim 7, wherein the damper member is tapered.

9. The turbine engine as recited in claim 7, further including at least one guide member fixed with regard to the first sidewall and the second sidewall, the at least one guide member including a bearing surface that circumscribes the damper member.

10. The turbine engine as recited in claim 9, wherein the bearing surface is frustoconical.

11. The turbine engine as recited in claim 7, wherein the damper member includes longitudinally alternating bearing sections and non-bearing sections with respect to a longitudinal axis defined by the airfoil body.

12. A method for processing an airfoil, the method comprising:
depositing multiple layers of a powdered metal onto one another;
joining the layers to one another with reference to data relating to a particular cross-section of an airfoil; and
producing the airfoil with an airfoil body including a leading edge and a trailing edge and a first sidewall and a second sidewall that is spaced apart from the first sidewall, the first sidewall and the second sidewall joining the leading edge and the trailing edge and at least partially defining a cavity in the airfoil body, a damper member enclosed in the cavity, the damper member being loose within the cavity, and at least one guide member fixed with regard to the first sidewall and the second sidewall, the at least one guide member including a bearing surface that circumscribes the damper member, wherein the at least one guide member includes at least one support arm fixed to at least one of the first sidewall or the second sidewall, and a guide piece is supported on the least one support arm, the guide piece including a guide wall that defines an opening through which the damper member extends, the guide wall including the bearing surface.

* * * * *